United States Patent [19]

Lynn

[11] Patent Number: 4,525,500

[45] Date of Patent: Jun. 25, 1985

[54] POLYMER-MODIFIED CEMENT MORTARS AND CONCRETES AND PROCESSES FOR THE PRODUCTION THEREOF

[75] Inventor: Michael E. Lynn, Tonbridge, United Kingdom

[73] Assignee: Marley Tile A.G., United Kingdom

[21] Appl. No.: 395,739

[22] Filed: Jul. 6, 1982

[30] Foreign Application Priority Data

Jul. 7, 1981 [GB] United Kingdom ............... 8120926

[51] Int. Cl.³ .................................. C04B 7/02
[52] U.S. Cl. ........................................ 524/5; 524/4
[58] Field of Search ......................... 524/4, 5

[56] References Cited

U.S. PATENT DOCUMENTS

| | | | |
|---|---|---|---|
| 3,634,567 | 1/1972 | Yang | 264/82 |
| 3,781,396 | 12/1973 | Okuda | 264/140 |
| 3,806,571 | 4/1974 | Ronnmark | 524/5 |
| 3,819,565 | 6/1974 | Yasima | 524/5 |
| 3,850,651 | 11/1974 | Duncan | 524/5 |
| 3,879,909 | 4/1975 | Lamoria | 524/5 |
| 3,947,398 | 3/1976 | Williams | 524/5 |
| 4,002,713 | 1/1977 | Duncan | 264/234 |
| 4,070,199 | 1/1978 | Downing et al. | 106/93 |
| 4,125,504 | 11/1978 | Mani | 524/5 |
| 4,229,224 | 10/1980 | Dawson et al. | 106/90 |
| 4,240,840 | 12/1980 | Downing et al. | 106/93 |
| 4,410,366 | 10/1983 | Birchall et al. | 106/90 |

FOREIGN PATENT DOCUMENTS 51-66316  6/1976  Japan.
2001261A  1/1979  United Kingdom.

OTHER PUBLICATIONS

Chemical Abstracts, vol. 79, 1973, No. 82862a.
Chemical Abstracts, vol. 84, 1976, No. 84: 78851g.

*Primary Examiner*—Paul R. Michl
*Attorney, Agent, or Firm*—Bacon & Thomas

[57] ABSTRACT

The invention provides articles made of polymer-modified cement mortars and concretes and processes for the production thereof. The processes comprise curing compositions which contain hydraulic cement and aqueous dispersions of polymers or copolymers of methacrylic or acrylic acid esters by means of a two stage curing process the first stage of which is carried out at an elevated temperature under conditions of high humidity and the second stage of which is carried out under drying conditions, preferably at elevated temperatures. The cement mortar and concrete articles according to the invention have relatively high Modulus of Rupture (MOR) values and preferably are roof tiles or shingles or other articles of relatively thin cross-section.

13 Claims, No Drawings

POLYMER-MODIFIED CEMENT MORTARS AND CONCRETES AND PROCESSES FOR THE PRODUCTION THEREOF

This invention is concerned with improvements in or relating to the production of polymer-modified cement mortars and concretes.

Cement mortars and cement concretes are widely used as cheap building materials. It is however recognised that such cement bonded materials have the disadvantages of low tensile and flexural strengths, low strain at failure, susceptibility to cracking and inferior chemical resistance.

One method of modifying concretes to overcome some of the above named disadvantages involves polymer impregnation. In this, an organic monomer containing a polymerisation catalyst is used to impregnate a partly cured concrete, and polymerisation of the monomer in the pores of the concrete is initiated whereby the material known as polymer-impregnated concrete is produced. The method involves the following stages:

(1) production of the partially cured concrete,
(2) drying by the application of heat,
(3) impregnation of the partially cured and dried concrete with monomer and catalyst by means of pressure or vacuum application,
(4) polymerisation of the monomer by gamma radiation or, more usually, by heat treatment of the impregnated concrete.

The exact details and possible variations of the above method are well known, but because of the complexity and therefore the cost of the method, the development and applications of polymer-impregnated concrete are more limited than they otherwise might have been.

Another method of modifying cement mortars and concretes is by the incorporation of polymers in the form of aqueous polymeric dispersions. Examples of such dispersions which have been described for this purpose include polyacrylate ester emulsions, ethylene/vinyl acetate emulsions and styrene/butadiene rubber latices. The aqueous polymeric dispersion is generally added to the cement and aggregate during mixing, and antifoaming agents are also frequently incorporated to control excessive air entrainment. Amounts of polymer added are conventionally 5 to 20 percent (calculated as the dry weight of the polymeric dispersion). It has been reported that the partial replacement of cement binder by polymeric binder in this way results in polymer-modified cement mortars and concretes having improved workability, strength, resistance to penetration by water, adhesion, chemical resistance, impact resistance, abrasion resistance, freeze-thaw stability, etc.

Polymer-modified cement mortars in which polyacrylate ester emulsions are incorporated have been used for industrial floor screeds. Examples of polyacrylate ester emulsions which are marketed for this purpose include Primal E-330 (also supplied as Rhoplex E-330) of Rohm & Haas (U.K.) Limited and Mowiton M-370 of Harlow Chemicals Limited. The manufacturer's technical literature for Primal E-330 indicates that, with formulations based upon Portland cement and sand and using 10 to 20% (dry weight) of the polymeric binder based upon the weight of cement, it is possible to produce polymer-modified cement mortars which after 28 days air curing at 25° C. and 50% relative humidity have flexural strengths, as measured by the test for Modulus of Rupture (MOR) as hereinafter described, of from 9 to 13 $MNm^{-2}$. The manufacturer's technical literature for Mowiton M-370 suggests that mortar products with MOR values up to 21 $MNm^{-2}$ can be obtained but this is only when a polymeric binder content of 40% (dry weight) based upon the weight of cement is used and air curing for 90 days has been effected.

The present invention is based upon the discovery that cement mortars and concretes of still further improved strength can be obtained by modification with certain polyacrylate polymers and copolymers and the use of a curing process in which curing is effected in two stages, the first stage being carried out at an elevated temperature under conditions of high humidity whereby hydration of the cement is effected, and the second stage being carried out under drying conditions whereby curing of the polymeric binder is effected. The second stage of the curing process is preferably also carried out at an elevated temperature, and in this way the entire two stage curing process can be completed within a relatively short period of time, e.g. within 48 hours, with a substantial increase in the strength of the product as compared with that obtainable using the same formulation with air curing at 25° C. and 50% relative humidity for a prolonged period. Using polyacrylates as hereinafter defined for the purpose of modification and the two stage curing process as referred to above, it has for example been found to be possible to obtain concrete products having a flexural strength of about the same level as that attainable in concretes produced by the relatively complex and costly method of polymer impregnation referred to above.

According to one aspect of the present invention, there is thus provided a process for the production of mortars and concretes which comprises curing a composition which contains hydraulic cement and an aqueous dispersion of a polymer or copolymer of a methacrylic or acrylic acid ester by means of a two stage curing process, the first stage being carried out at an elevated temperature under conditions of high humidity whereby hydration of the cement is effected, and the second stage being carried out under drying conditions whereby curing of the polymer or copolymer is effected, the said polymer or copolymer dispersion having a viscosity of less than 1,500 cps when measured by means of a Brookfield LVT viscometer using Spindle 2, 12 rpm at a temperature of 23° C., and a minimum film-forming temperature (MFT) of not lower than 5° C.

According to a further feature of the present invention, there are provided moulded articles made of mortars and concretes modified by means of polymer or copolymer dispersions as hereinbefore defined and having MOR values in excess of 22.5$MNm^{-2}$ and preferably in excess of 25 $MNm^{-2}$.

The process according to the invention is applicable with particular advantage to the production of moulded articles of relatively thin cross-section, e.g. articles which in section have thicknesses of not greater than 50 mm, especially not greater than 25 mm, and more especially not greater than 20 mm. The moulded articles according to the present invention are thus preferably of relatively thin cross-section.

The production of polymer-modified cement mortars of high flexural strength, with MOR values in excess of 22.5 $MNm^{-2}$, makes possible the use of this relatively cheap material for a wide range of new applications. For example, the minimum standard flexural strength for fully compressed asbestos cement as used for roof tiles and shingles requires a MOR value of 22.5 MNm$^{-2}$ and the process according to the present invention makes possible the production of polymer-modified cement mortar roof tiles of comparable or higher flexural strength. Other possible uses for the polymer-modified cement mortars and concretes of improved strength obtainable by the process according to the invention are as materials for domestic and industrial flooring tiles, wall tiles, panelling for walls, ceilings, floors and roofing, corrugated sheeting, e.g. for fencing and roofing, and extruded piping. Roof tiles and shingles as hereinbefore defined and having MOR values in excess of 22.5 MNm$^{-2}$ constitute particularly preferred features of the present invention.

Roof tiles and shingles according to the invention can for example be produced using the conventional roller and slipper methods of manufacture. Other moulded articles according to the invention can be produced by conventional moulding techniques, for example by vibration and/or pressure moulding.

Formulations for use in the production of such polymer-modified cement mortars and concretes will in general include the following ingredients:-

(i) Cement

This is conveniently provided by Portland cement, rapid hardening Portland cement being preferable. In general, ordinary Portland cement has a surface area of approximately 350 m$^2$/kg whilst rapid hardening Portland cement has a surface area of approximately 450 m$^2$/kg. The Portland cement used for the present invention advantageously has a surface area within the range of 350 to 500 m$^2$/kg with surface areas of 425 to 475 m$^2$/kg being particularly preferred.

(ii) Aggregate

This is conveniently provided by sand, for example silica sand. It is preferred to use sand which has a relatively low porosity, sands with a porosity less than 1.5% being particularly preferred. If available it may be advantageous to utilise sands having an especially low porosity down to 0.3% or lower, the above-mentioned porosity figures being measured according to British Standard 812:1967. In order accurately to control the amount of water and also to keep the amount of water used to the minimum necessary to provide a formulation having acceptable workability, it is advantageous to use substantially dry sand as the aggregate. The amount of sand or other aggregate should not be sufficiently large as to reduce the strength of the product below an acceptable level. In general, it is advantageous to use the maximum amount of aggregate which gives a product of acceptable strength, sand or other aggregates usually being the cheapest of the solid ingredients in the formulation. With sand, it has been observed that products of good strength are generally obtainable with sand:cement ratios by weight of up to 3.75:1.

If desired, a lightweight filler can be used to partially or completely replace the sand aggregate. The lightweight filler is conveniently provided by a material called cenospheres, which is for example available under the trade name 'Fillite' from Fillite (Runcorn) Limited of Runcorn, Cheshire, England. This material is the lightweight fraction obtained by collecting the material floating on the surface of water in lagoons containing fly ash, produced as a by-product of the combustion of coal in power stations, and consists of hollow spherical particles which are very lightweight. The partial or complete replacement of sand by lightweight filler can for example be carried out on a weight for weight or volume for volume basis and can be used to provide lightweight versions of polymer-modified cement mortars and concretes according to the invention.

The addition of cenospheres to the mix, substituting for sand on a weight for weight basis, does result in a substantial reduction in flexural strength as measured by the MOR test, the greater the substitution of sand by cenospheres the greater being the reduction of the MOR. Nonetheless, there is an advantage in at least partial substitution of the sand by cenospheres in that lightweight materials can thereby be obtained which still have MOR values equivalent to or even higher than those obtained in the usual range of strengths of standard sand/cement mortars, depending on the percentage addition of cenospheres. For a strength equivalent to normal sand/cement mortars, the maximum permitted substitution of sand by cenospheres is in general 35% on a weight for weight basis. The density of the materials obtained will be less than standard sand/cement mortars, the value for a particular mortar depending on the percentage of sand substituted by cenospheres. The greater the percentage of sand substituted by cenospheres, the lower the density of the material obtained. At 35% substitution of sand by cenospheres on a weight for weight basis, the value of the density obained was found to be 1.05 gcm$^{-3}$ whereas the typical value obtained for zero substitution of sand by cenospheres is 2.16 g cm$^{-3}$. Thus it can be seen that a polymer-modified mortar can be obtained which has less than one half the density of a standard sand/cement mortar, but with an equivalent flexural strength. Roof tiles and shingles and other moulded articles made of lightweight polymer-modified cement mortars (with a dry density not greater than half that of cement mortar made using a conventional mix with a ratio of sand to cement of 3.5:1), and particularly those having MOR values of at least 12 MNm$^{-2}$, thus provide further features of the present invention.

Moulded articles according to the invention in which cenospheres are used to provide at least a portion of the aggregate also in general have the advantage of relatively good thermal insulating properties. Thus for example moulded articles in which sand aggregate has been completely replaced by cenospheres on a volume for volume basis have been shown to have a thermal conductivity ($\lambda$) at 3% moisture of as low as 0.174 Wm$^{-1}$ °C.$^{-1}$ (see Example 10). This is to be compared with a $\lambda$ value for a standard mortar of about 1.75 Wm$^{-1}$ °C.$^{-1}$.

The lightweight moulded articles of the invention can also be produced by conventional moulding techniques, for example extrusion (e.g. to form roof tiles), pressure forming and ram extrusion.

Another advantage of partial or complete replacement of sand by cenospheres is that the mix obtained has been found to be readily mouldable. It can thus be formed into a variety of shapes and has the advantage of having little or no tendency to slump or to show any other deformation after moulding. It is envisaged therefore that lightweight polymer-modified cement mortars and concretes according to the invention could also have many applications of a decorative nature.

(iii) Methacrylate or acrylate polymer or copolymer dispersion

As referred to above, the polymer or copolymer dispersion should have a viscosity of less than 1,500 cps when measured by means of a Brookfield LVT viscometer using Spindle 2, 12 rpm at a temperature of 23° C., and a minimum film-forming temperature (MFT) of not lower than 5° C. The dispersion is preferably stable at alkaline pHs of at least 8 and above, it being advantageous to use dispersions having a pH of above 8. The selection of such polymer or copolymer dispersions for use in the two stage curing process as defined above enables moulded articles of high flexural strength in accordance with the present invention to be obtained. Preferred and especially preferred polymer or copolymer dispersions for use in the present invention have the following properties:

|  | Preferred | Especially preferred |
| --- | --- | --- |
| Viscosity | below 1,000 | below 750 |
| Minimum film-forming temperature (MFT) | 5 to 70° C. | 10 to 60° C.* |
| pH of the dispersion | at least 9.0 | 9.5 to 10.0 |

*The especially preferred MFT minimum of 10° C. applies only to dispersions of polymers and copolymers which do not undergo cross-linking reactions during the curing process. Where such cross-linking reactions occur, then the MFT value of especially preferred dispersions may be less than 10° C.

The minimum film-forming temperatures (MFT) for the polymer dispersions can for example be estimated by the standard method of German DIN 53787 but it will be appreciated that other methods giving comparable estimations are also available.

Methacrylate and acrylate polymer and copolymer dispersions are usually in the form of emulsions which contain stabilising agents. Colloidal stabilising agents are sometimes used for this purpose but it has been found that the presence of such colloidal stabilising agents in dispersions for use in the present invention is disadvantageous. The dispersions which are employed in the present invention should accordingly be free of colloidal stabilising agents and are advantageously stabilised by means of ionic or non-ionic surfactants. If desired, further surfactant can be added to the formulation in order to improve workability.

Preferred dispersions for use in the invention are copolymers of an alkyl methacrylate or acrylate and methacrylic or acrylic acid. The alkyl methacrylate or acrylate preferably contains alkyl groups with from 1 to 8 carbon atoms. Other copolymerisable monomers which may conveniently be present in the copolymers of the dispersions include styrene. Examples of dispersions which can be used in the invention are as follow:

Primal E-330, Primal B-60A, Primal MC-76, Primal AC-61, Primal SS-521, and Primal AC-73 all available from Rohm & Haas (UK) Limited;
Plextol M618 and Plextol M718, available from Rohm GmbH, Darmstadt, Germany.

All these materials are supplied as aqueous dispersions and thus their use involves the incorporation not only of the polyacrylate binder but also of an amount of water into the formulation. The solids content of the dispersions used is preferably from 40 to 60% by weight, advantageously from 45 to 55% by weight. The amount of the polymeric binder used (expressed as dry weight of the polymer) is conveniently within the range of from 10 to 40%, preferably from 15 to 30% and advantageously about 20%, based upon the weight of cement in the formulation.

(iv) Antifoaming agent

The presence of entrained air in the polymer-modified cement mortars and concretes reduces the strength of the materials. It is therefore advantageous to incorporate in the formulation an effective amount of an antifoaming agent such as for example 'Bevaloid 60' or 'Bevaloid 691' antifoaming agent as supplied by Bevaloid Limited, Beverley, Yorkshire, England. Bevaloid 60 and Bevaloid 691 antifoaming agents are of the paraffinic oil type, but other antifoaming agents, for example of the silicone type, can if desired be used. Approximately 1% by weight, based upon the dry weight of the polymeric binder, of a paraffinic oil antifoaming agent such as Bevaloid 60 or Bevaloid 691 has been found to be effective.

(v) Water

Increasing amounts of water in the formulation have been found to provide mortars and concretes of decreasing strength. It is necessary for the formulation to contain sufficient water to provide adequate workability, and in general it has been found to be advantageous to use formulations containing only the amount of water necessary for this purpose. The minimum amount of water which can conveniently be incorporated in the formulation is that presenc in the polyacrylate ester aqueous dispersion. This may be sufficient for certain purposes, the amount of water necessary for adequate workability depending to some extent upon the method of compaction to be used in the production of mortar using the formulation. Thus, for example, if mechanical compaction is used, then a more difficultly workable formulation may be acceptable as compared with that needed with hand compaction. A weight ratio of water:cement of at least 0.20:1 is usually preferred, and advantageously the said weight ratio is within the range of from 0.20:1 to 0.30:1.

When producing polymer-modified cement mortars, using formulations as described above, it is advantageous to mix any added water with the polyacrylate dispersion before addition of these ingredients to the sand and cement. It has been found that in this way the total amount of water which is needed in the formulation to give acceptable workability is less than is the case if water is separately added to the cement and/or aggregate or is already present in the aggregate as would be the case if wet sand instead of substantially dry sand were to be used as an ingredient. Preferably the polyacrylate dispersion, the antifoaming agent and any added water are mixed together and the mix thereby obtained is added to a mix of the cement and sand or other aggregate.

The first stage of the curing process according to the invention involves the use of elevated temperatures and high humidity. The use of elevated temperatures accelerates hydration of the cement, and preferably the temperature used is at least sufficient to ensure that a major part (e.g. at least 75 to 80%) of the cement is hydrated within a period of 24 hours. The preferred temperature range for this purpose is from 35° or 40° C. to 60° C. At the lower end of this range the first stage of the curing process may need to be carried out for a full 24 hours; at the higher end of this range, curing for as short a period as 8 hours may be sufficient. If desired, temperatures above 60° C., e.g. up to 100° C., may be used with still shorter periods of time being necessary. High pressure autoclaving with temperatures in excess of 100° C. may also be used.

In order to promote hydration of the cement during the first stage of the curing process, it is necessary that conditions of high humidity should be used. In general, the relative humidity should be at least 75% and is with advantage within the range of 80 to 100%. The high humidity conditions can conveniently be provided by means of a conventional humidity oven when temperatures up to 100° C. are to be employed. With higher temperatures, autoclaves capable of providing high humidity conditions can be used.

After the first stage of the curing process, it is in general convenient to demould the semi-cured article and to transfer it to a drying oven for carrying out the dry cure of the second stage of the curing process. Semi-cured moulded articles of polymer-modified cement mortar obtained at this stage of the process according to the invention have been found to have sufficient strength for handling and transportation, and indeed to have a strength comparable with moulded articles produced from conventional cement mortars.

The second stage of the curing process is carried out under drying conditions whereby curing of the polymeric binder is effected. It is necessary that the humidity should be much lower than that in the first stage of the curing process in order to provide the necessary drying conditions. In general, this stage of the process should be effected at a relative humidity of not greater than 50% and preferably not greater than 45%, and if desired much lower humidities than are represented by these limits may be used. Temperatures of at least 40° C. and more especially at least 45° to 50° C. are preferably used. In general, the use of higher curing temperatures in this stage of the process gives rise to products of increased flexural strength and particularly good results have been obtained using curing temperatures within the range of 55° to 80° C. Even higher second stage curing temperatures can if desired be used. The second stage of the curing process is conveniently carried out in a drying oven and a period of time of not greater than 24 hours will in general be sufficient. At higher temperatures, shorter periods of time may suffice.

In particularly dry climates such as for example that of California, USA, it may be possible to carry out the second stage of the process at ambient temperature and humidity. If this is done, the second stage will be prolonged as compared with when higher temperatures are used, particularly in climates where conditions of higher humidity are to be expected at night so that the drying process is mostly confined to only a part of each day. Nonetheless, the economic advantage of carrying out the second stage of the process at ambient temperature and humidity may outweigh any disadvantages which result.

It will be understood that there are other methods which may be used for carrying out the two stage curing process in accordance with the invention. For example a vacuum oven, microwave oven or radiofrequency drier may conveniently be used to accelerate the second stage of the curing process under drying conditions.

Whilst the products and processes according to the invention have been described with more particular reference to polymer-modified cement mortars, it will be appreciated that the present invention is also applicable to polymer-modified cement concretes where similar advantages are obtainable.

The following examples illustrate the invention. In these examples, the method of testing for flexural strength is as follows:

The Modulus of Rupture (MOR) is measured by a four point bending test which gives better reproducibility of results with stiff materials than the three point bending test. The tests are carried out on a Monsanto tensometer, the size of specimen used being 17.78 × 5.08 × 1.27 cm (7 × 2 × 0.5 ins) and of rectangular cross-section.

To carry out the test, the specimen is loaded into the test jig such that the loading points are equidistant from the ends of the specimen and the distance between the two loading points is greater than or equal to one third of the total span. The load is applied such that the rate of deflection is 1.6 mm/min, the ultimate load to breakage is recorded and the dimensions of the fractured specimen are measured at the point of the break.

The MOR of the specimen is then calculated as follows:-

W is the ultimate load applied
D is the distance between the load and the nearest outer support
b is the breadth of the specimen
d is the thickness of the specimen.
The MOR is given by the expression $$MOR = \frac{3\ WD}{bd^2}$$

EXAMPLES 1-8

Formulation:
600 g Washed pit sand, zone 2 sieved to 0-2.36 mm., 1.25% porosity (according to British Standard 812:1967)
200 g Ordinary Portland cement or rapid hardening Portland cement
84 g Polymer or copolymer dispersion. (see the following Table)
0.8 g Bevaloid 60 or Bevaloid 691 antifoaming agent (Bevaloid Limited)
10 mls Water.

Method of Preparation of Moulded Article

The sand and cement are mixed in a planetary mixer for 1 to 2 minutes. The dispersion, antifoaming agent and water are separately mixed and, after addition to the sand and cement, mixing is continued for a further 2 minutes. The mix is then tamped into 17.78 × 5.08 cms (7 × 2 ins) moulds and trowelled flat to a thickness of 10 mm. The filled moulds are then heated in a humidity oven at 50° C. and 100% relative humidity for 24 hours.

After removal from the humidity oven, the semi-cured moulded articles are placed in a drying oven and heated at 75° C., again for 24 hours.

The MOR values for 3 specimens thus obtained were estimated by the method as hereinbefore defined and the results are given in the following Table.

| Example No. | Acrylate Polymer (by Trade Name) | Properties of Polymer dispersions ||||| Flexural strengths of specimens obtained ||||
| --- | --- | --- | --- | --- | --- | --- | --- | --- | --- |
| | | Viscosity (centipoises) | pH | Minimum Film-Forming Temp. (°C.) | % Solids | Using Ordinary Portland cement (with Bevaloid 60) || Rapid hardening Portland cement (with Bevaloid 691) ||
| | | | | | | Max. MOR(MNm$^{-2}$) | Average MOR(MNm$^{-2}$) | Max. MOR (MNm$^{-2}$) | Average MOR (MNm$^{-2}$) |
| 1 | Primal* B-60A | 560 | 9–9.9 | 9 | 46–47 | 23.6 | 22.6 | 27.8 | 25.6 |
| 2 | Plextol M618 | 650 | 9–10 | 44 | 52–54 | 21.7 | 21.0 | 21.2 | 19.2 |
| 3 | Primal MC76 | 76 | 9.5–10 | 11 | 46–48 | 18.8 | 16.9 | 16.8 | 16.4 |
| 4 | Plextol M718 | 320 | 9.5–10 | 70 | 53 | 19.3 | 18.9 | 19.6 | 18.3 |
| 5 | Primal E330 | 90 | 9.5–10 | 11 | 46–48 | 18.6 | 17.3 | 18.5 | 17.1 |
| 6 | Primal SS521 | 160 | 9.5–10 | 45 | 50 | 22.0 | 21.4 | 22.2 | 21.4 |
| 7 | Primal AC73 | 14 | 9–10 | 35 | 46–47 | 23.5 | 22.2 | 27.4 | 26.1 |
| 8 | Primal** AC61 | 47 | 9.5–10 | 18 | 46–47 | 19.3 | 17.0 | — | — |

*This polymer is cross-linked during the process
**Low surfactant level, so 0.7 g. of Synperonic PE39/70 (Imperial Chemical Industries Ltd.) was added to achieve workability.

EXAMPLE 9

Formulation:
420 g Washed pit sand, zone 2 sieved to 0–2.36 mm., 1.25% porosity (according to British Standard 812:1967)
180 g Cenospheres
200 g Rapid hardening Portland cement
84 g primal B-60A emulsion (Rohm & Haas (UK) Limited), 47% resin
0.8 g Bevaloid 60 antifoaming agent (Bevaloid Limited)
8 mls Water Method of Preparation of Moulded Articles The sand, cement and cenospheres are mixed together in a planetary mixer for 1 to 2 minutes. The procedure for mixing in the other ingredients, forming into moulds and curing are as described in Examples 1–8.

Three specimens thus produced were found to have an average MOR value of 4.8 MNm$^{-2}$ with a maximum MOR value of 5.7 MNm$^{-2}$.

EXAMPLE 10

Formulation
110 g Cenospheres
200 g Rapid hardening Portland cement
84 g Primal B-60A emulsion (Rohm & Haas (UK) Limited), 47% resin
0.8 g Bevaloid 691 antifoaming agent (Bevaloid Limited)
8 mls Water Method of Preparation of Moulded Articles The cement and cenospheres are mixed together in a planetary mixer for 1 to 2 minutes. The procedure for mixing in the other ingredients, forming into moulds and curing are as described in Examples 1–8.

Three specimens thus produced were found to have an average MOR value of 13.4 MNm$^{-2}$, a density of 0.82 g/cm$^3$ and a thermal conductivity at 3% moisture of 0.174 Wm$^{-1}$°C$^{-1}$.

I claim:

1. A process for the production of mortars and concretes which comprises curing a composition which contains hydraulic cement and an aqueous dispersion of a polymer or copolymer of a methacrylic or acrylic acid ester by means of a two stage curing process, the first stage being carried out at an elevated temperature under conditions of high humidity whereby hydration of the cement is effected, and the second stage being carried out under drying conditions and elevated temperature whereby curing of the polymer or copolymer is effected, the said polymer or copolymer dispersion having a viscosity of less than 1,500 cps when measured by means of a Brookfield LVT viscometer using spindle 2, 12 rpm at a temperature of 23° C., and a minimum film-forming temperature (MFT) of not lower than 5° C., wherein the polymer or copolymer is present in an amount of from 10 to 40% based upon the weight of cement in the composition.

2. A process according to claim 1 in which the polymer or copolymer dispersion is stable at alkaline pHs of at least 8 and above.

3. A process according to claim 2 in which the polymer or copolymer dispersion has a pH of above 8.

4. A process according to claim 1 in which the aqueous dispersion contains a copolymer of (i) an alkyl methacrylate or acrylate in which the alkyl groups have from 1 to 8 carbon atoms and (ii) acrylic acid.

5. A process according to claim 1 in which the said composition contains as aggregate sand having a porosity of less than 1.5% (when measured according to British Standard 812:1967) and/or cenospheres.

6. A process according to claim 1, 2, 3, 4, or 5 in which the first stage of the curing process is effected at a temperature of at least 35° C. and a relative humidity of at least 75%.

7. A process according to claim 1 wherein the said polymer or copolymer dispersion comprises Primal B-60A.

8. A process according to claim 1 or 7 in which the second stage of the curing process is effected at a relative humidity of not greater than 50%.

9. Moulded articles having a thickness in section of not greater than 25 mm, said articles being made of mortars or concretes modified by means of polymer or copolymer dispersions as defined in claim 1 and having Modulus of Rupture (MOR) values in excess of 22.5 MNm$^{-2}$.

10. Articles according to claim 9 having MOR values in excess of 25 MNm$^{-2}$.

11. Moulded articles having a thickness in section of not greater than 25 mm, said articles being made of mortars or concretes containing cenospheres as lightweight aggregate, having a dry density not greater than half that of cement mortar made using a conventional mix with a ratio of sand to cement of 3.5:1, being modified by means of polymer or copolymer dispersions as defined in claim 1 and having MOR values of at least 12 MNm$^{-2}$.

12. Articles according to claim 11 in the form of roof tiles and shingles.

13. Articles according to claim 11 in the form of roof tiles and shingles.

* * * * *